Fig. I.

INVENTOR
Frank W. Hochmuth
BY Eldon H. Luther
ATTORNEY

Jan. 1, 1963  F. W. HOCHMUTH  3,071,448
CHEMICAL RECOVERY UNIT WITH IMPROVED SUPERHEATER CONSTRUCTION
Filed June 15, 1959  2 Sheets-Sheet 2

INVENTOR.
Frank W. Hochmuth

BY Eldon H. Luther
ATTORNEY

United States Patent Office 3,071,448
Patented Jan. 1, 1963

3,071,448
CHEMICAL RECOVERY UNIT WITH IMPROVED
SUPERHEATER CONSTRUCTION
Frank W. Hochmuth, Scotch Plains, N.J., assignor to Combustion Engineering, Inc., New York, N.Y., a corporation of Delaware
Filed June 15, 1959, Ser. No. 820,306
6 Claims. (Cl. 23—277)

This invention relates generally to chemical recovery units within which the liquor obtained from the digestion of wood or other cellulose material with certain chemicals, as is the practice in the pulp industry, is introduced into the furnace of the unit where the burnable portion of the liquor is burned with chemicals in the liquor being smelted and drawn off at the lower end of the furnace.

In these chemical recovery units as presently employed a portion of the heat that is evolved by burning the liquor is used to generate steam with the combustion gases passing over suitable heat exchange surface for this purpose.

In the operation of these units for the burning of and recovery of chemicals from the residual liquor, the liquor which is sprayed into the furnace has a substantial moisture content with most of the moisture being driven from the liquor spray upon its introduction into the furnace because of the high temperature in the furnace and the hot gases passing upwardly through the furnace and spray and with the remaining solid particles falling onto the furnace hearth and forming a roughly truncated pile. During the descent to the hearth some of the lighter volatiles are driven from these solid particles with the remaining volatiles being liberated and the combustible material in the solids being burned in this pile that forms upon the hearth with this combustion being supported by the introduction of preheated primary air which is directed generally over and upon this pile of material. With the volatile matter and the combustibles contained in this solid material being burned there remains upon the hearth only the non-combustible which includes the chemicals that are to be recovered along with traces of various impurities with these being smelted upon the hearth and removed through a suitable spout. Since the solid material that descends to the hearth is very light and fluffy, some of this material is entrained in the upwardly moving stream of combustion gases that passes up through the furnace with this entrained material including chemicals which are softened or melted in their upward ascent in the furnace. These chemicals contact various heat exchange surface that form part of the chemical recovery unit and flow in a molten state down along this surface. Among the heat exchange surface included in the chemical recovery unit of this invention is superheater surface generally in the form of panels or platens that extend down into the furnace from the upper end thereof with these platens being disposed in parallel planes that extend from the front to the rear of the furnace and are spaced across the furnace. The molten chemicals that ascend through the furnace contacts these superheater platens and flows down the same and drips off the end thereof.

It has heretofore been the practice to design these chemical recovery units to produce superheated steam of a temperature of about 700° F. This gives a metal temperature of the tubes at the lower end and the hottest section of the panel superheater of about 850° F. With these conditions experience has shown that it is necessary to replace the U-bends of the outermost tube at the lower end of the superheater panels in from 5 to 7 years. This periodical replacement is not intolerable and is something that is accepted. The exact cause of the deterioration of this lower tube portion is not known although it is known that the temperature that is involved is an important factor with the higher the temperature the more rapid the deterioration and it is theorized that the chemical flows down the platen and drips off this tube portion at the bottom thereof and the contact of this chemical by the upwardly flowing stream of combustion gases forms a flow pattern with regard to the molten chemicals on the lower surface of the tube portion at the bottom of the platen which results in the metal at this location wearing away. As the steam temperature increases the problem becomes much more severe and the present invention is concerned with a chemical recovery unit for producing 900° F. or above steam temperature under which conditions if corrective measures were not taken with regard to the problem the period of replacement of the lower end portions of the superheater platens would be exceedingly short and indeed would render the whole unit entirely impracticable.

In accordance with the present invention this problem is alleviated by forming the superheater platens so that a relatively cool tube portion extends across the bottom of the hottest platen portion with the slag running down the platen dripping off this relatively cool portion and accordingly greatly increasing the time period required for replacing this tube portion as contrasted with that which would be necessary if the slag dripped off the bottom of the hottest portion of the superheater panel.

It is an object of this invention to provide an improved chemical recovery unit for producing superheated steam at about 900° F. or above.

Other and further objects of the invention will become apparent to those skilled in the art as the description proceeds.

With the aforementioned objects in view, the invention comprises an arrangement, construction and combination of the elements of the inventive organization and in such a manner as to attain the results described as hereinafter more particularly set forth in the following detailed description of an illustrative embodiment, said embodiment being shown by the accompanying drawing wherein.

Figure 1:
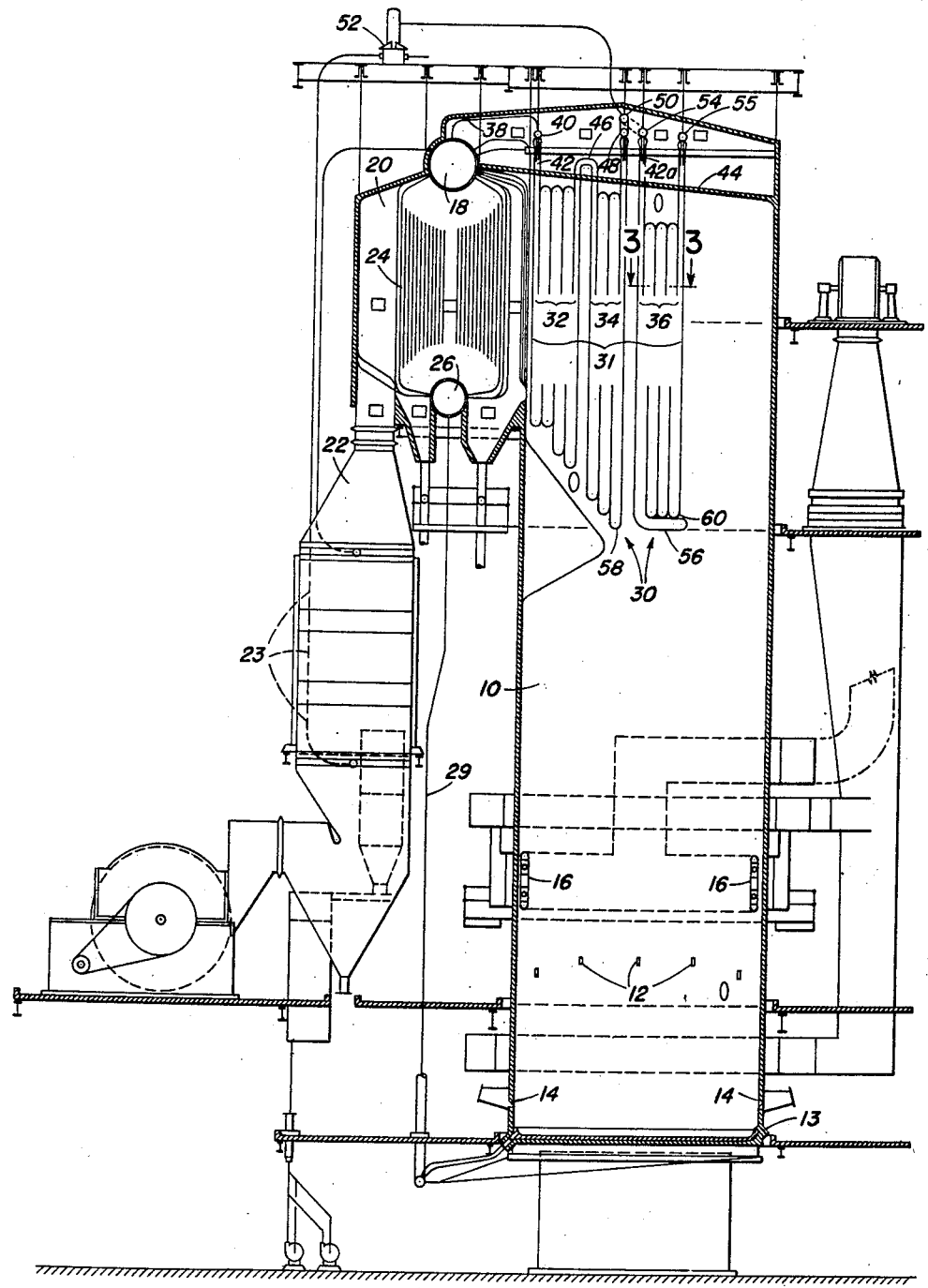
FIG. 1 is a somewhat diagrammatic representation in the nature of a vertical section of a chemical recovery unit employing the present invention.
Figure 2:
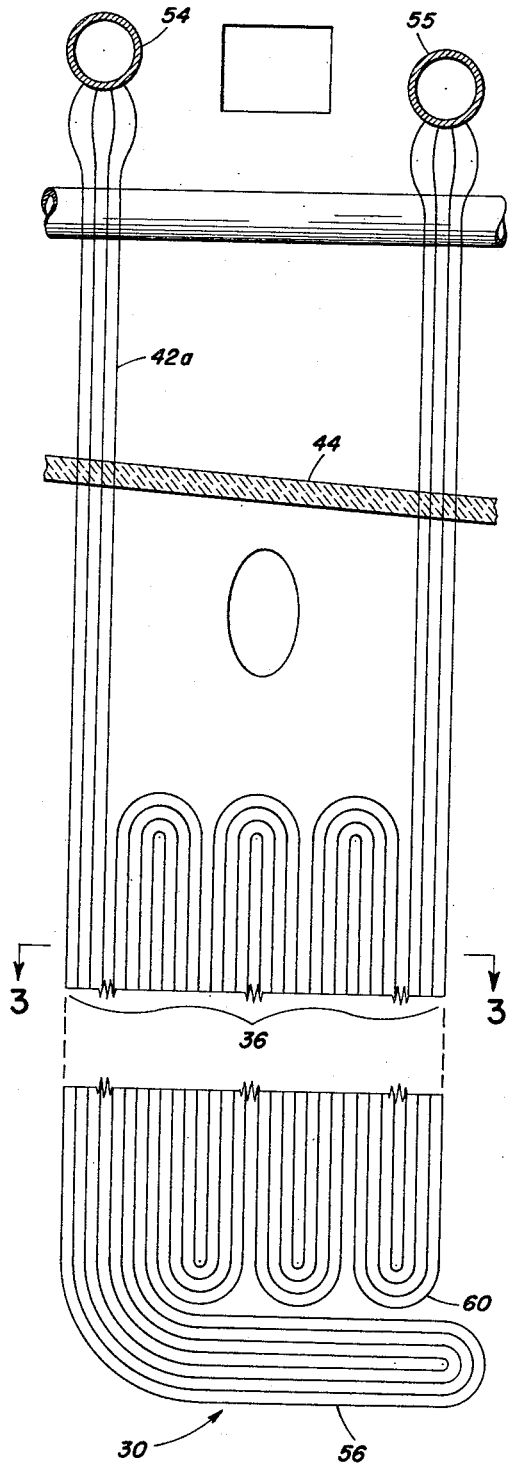
FIG. 2 is a detailed side view of the final section of one of the superheater panels.
Figure 3:
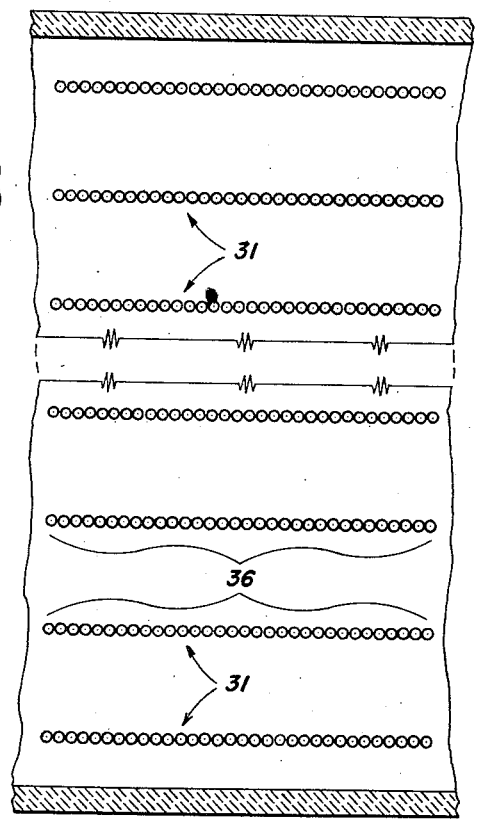
FIG. 3 is a detailed fragmentary sectional view showing the disposition of the superheater platens as spaced across the upper portion of the furnace with this figure being taken generally along line 3—3 of FIGS. 1 and 2.

Referring now to the drawing, wherein like reference characters are used throughout to designate like elements, the illustrative and preferred embodiment of the invention depicted therein includes a chemical recovery unit which has a furnace 10 into which residual liquor that is obtained in the chemical digestion process of cellulose bearing material is introduced through the openings 12 by means of suitable nozzles not shown. This liquor which has been suitably concentrated prior to its introduction descends toward the furnace bottom with moisture being driven therefrom with portions of the liquor burning during this descent and with the dried liquor collecting on the bottom or hearth of the furnace where the burning continues with molten chemical being withdrawn through spout 13. Combustion supporting air is directed generally at the pile of liquor on the bottom of the furnace through the openings 14 with additional combustion supporting air being directed into the furnace, in generally a tangential manner, through openings 16.

The furnace 10 has its walls lined with steam generating tubes which are connected at their upper ends with steam and water drum 18 which forms part of the boiler or steam generating portion of the chemical recovery unit. At the rear of the upper end of the furnace is provided an opening through which the combustion gases pass with these gases passing through the laterally disposed gas pass 20 and then down through the vertically extending gas pass 22 with this latter gas pass having suitable economizer surface 23, as is conventional, disposed therein. Within lateral gas pass 20 is disposed additional steam generating surface identified as 24 and which extends from steam and water drum 18 to mud drum 26 with downcomer 29, which supplies the steam generating tubes that line the furnace walls, extending from this drum 26.

Saturated steam is taken from drum 18 and is passed through the superheater 30 of the unit with this superheater raising the temperature of the steam to the desired degree of superheat and in the case of the present invention raising the temperature of the steam to about 900° F. or above.

The superheater 30 is in the form of panels or platens 31 that are spaced across the furnace from side to side with each of the panels being disposed in a vertical plane that extends from front to rear of the furnace. As illustratively shown each of the panels is comprised of three sections 32, 34 and 36 with the panel being formed by a number of tubes disposed in side by side relation, there being four in the illustrated superheater shown, and with these tubes being sinuously bent as indicated. Steam is received from drum 18 through connecting conduits 38 which conveys the saturated steam to inlet header 40 of the superheater. The tubes 42 that make up the platen extend from this header down to the bottom of section 32 where they are reversely bent and then continue to extend up and down the length of this section until they extend from the roof 44 of the furnace and are reversely bent at 46, with this construction being for support purposes and with the tubes then extending down into the upper portion of the upper furnace again where they are similarly reversely bent to form section 34 of the platen. From section 34 the tubes connect with intermediate header 48. The steam passes from this header 48 through the desuperheater 50 which receives regulated and controlled amounts of condensate from condenser 52 in order that the final steam temperature will be controlled as desired within particular limits with this desuperheater being of the spray, contact type. From the desuperheater 50 the steam enters intermediate header 54 with tubes 42a extending from this header to make up the final section 36 of the superheater platen. These tubes extend down along the rear portion of section 36 and at the lower end are bent at right angles and extend horizontally at least to and preferably somewhat beyond the front portion of this section 36 where they are reversely bent and then extend back up to the upper end of platen section 36 and thereafter extend up and down this platen section as illustratively shown, finally extending up through the roof 44 and connecting with outlet header 55. Thus the horizontally extending portion identified as 56 forms the lower end of platen section 36.

In operation, particles of molten chemical are entrained in the upwardy moving stream of combustion gases in furnace 10 with some of these chemical particles collecting on the platens of superheater 30 so that molten chemical runs down these platens and drips off the lower end thereof. The sections 32 and 34 are of sufficiently low temperature so that wearing away of the bottom-most tubes of these sections is not a serious problem. As for example, the temperature of the steam entering header 48 may be 700° F. with the metal temperature of the outside tube at the location identified as 58 being about 850° F. This condition does not impose a serious wastage problem. However, the temperature of the steam leaving header 55, i.e., the final steam temperature, is about 900° F. and the temperature of the tube at the location identified as 60 is about 1050° F. If this were the metal temperature at the lower end of the panel from which the molten chemical dripped the metal wastage problem would be intolerable. By constructing platen section 36 in the manner described the lowest or lower-most tube at the horizontal location identified as 56 will have a metal temperature of about 800 to 900° F. which corresponds favorably with that at location 58 and accordingly provides acceptable operating conditions.

By means of desuperheater 50 the temperature of the steam in header 54 and accordingly that which enters the platen section 36 will be somewhat lower than the steam temperature exiting from platen section 34 and leaving header 48. This has the effect of decreasing the tube metal temperature at the location 56 and accordingly presenting more desirable operating temperatures at these locations.

With the organization of this invention the molten chemical that flows down platen section 36 will drip off the horizontally disposed tube portion 56 and down to the bottom of the furnace. This tube portion has a much lower temperature than the tube portion of section 36 at the location 60 and accordingly the unit may operate at 900° F. superheat steam temperature or above with the attendant higher efficiency that results from this increasing steam temperature and without the intolerable maintenance problem that would prevail without this invention.

Figure 4:
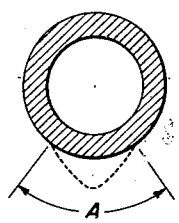
FIG. 4 is a detailed view of the lowermost tube portion of the platen superheater and shows the formation of the slag as it drips from this tube portion.

FIG. 4 illustrates the way in which the molten chemical drips off or flows from the bottom-most tube of the platen superheater. The outer portion of the tube wears away through an arc A of about 60 to 90° at the lower side of the tube as shown. As mentioned previously the temperature of the metal is an important factor in the rate at which the metal wastes away and by providing a lower temperature for this lowermost tube in the present invention the problem with regard to the metal wastage is alleviated so that steam temperature of 900° F. and above may be produced.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. A chemical recovery unit including an upright furnace, means for introducing liquor thereinto for burning the burnables and smelting the chemicals therein, means for removing smelted chemicals from the lower region thereof, said unit including means for generating superheated steam of at least about 900° F. including a plurality of superheater panels disposed in spaced relation across the upper portion of the furnace and extending downwardly thereinto and downwardly along which flows molten chemical, with these panels including the finishing stage of the superheater wherein the steam is heated to its final desired temperature of at least 900° F., said panels being comprised of a number of side-by-side co-planar bare tubes that extend vertically up and down in unison a number of times providing a plurality of vertical runs of each tube with the tubes being reversely bent in internested fashion at the upper and lower end of the vertical runs to thereby form a panel of substantial width, said tubes communicating with inlet and outlet headers to convey the steam serially through the tube runs from the inlet to the outlet header with the steam discharging from the panel into the outlet header being at its final temperature, and from a location remote from the final tube runs of the panel, tubular portions of the panel extending horizontally beneath and adjacent the panel portion including said final tube runs, whereby the molten chemical which runs down the panel drips from the horizontally extending tube portion which forms the lower end of the panel.

2. A chemical recovery unit including an upright furnace, means for introducing liquor thereinto for burning the burnables and smelting the chemicals therein, means for removing smelted chemicals from the lower region thereof, said unit including means for generating superheated steam of at least about 900° F. including a plurality of superheater panels disposed in spaced relation across the upper portion of the furnace and extending downwardly thereinto and downwardly along which flows molten chemical, each of said panels including a number of sections in serial relation and successively disposed from front to back of the furnace, an inlet header with which the inlet of one of said sections is connected to supply steam thereto and the outlet header with which the final section is connected to deliver the finally heated steam thereto, a desuperheater operatively disposed intermediate a pair of said sections, said final panel section being comprised of a number of side-by-side coplanar tubes that extend vertically up and down in unison a number of times providing a plurality of vertical runs of each tube with the tubes being reversely bent in internested fashion at the upper and lower ends of the vertical runs to thereby from a final panel section of substantial width with the steam serially flowing through these runs, and from a location remote from the outlet and the final tube runs of the final panel section portions of at least one of the tubes of the panel extending horizontally beneath and adjacent the portion of the final panel section extending from said location to and including the final tube runs, whereby the molten chemical which runs down the final panel section drips from the horizontally extending tube portion which forms the lower end of this panel section.

3. The organization of claim 2 wherein the desuperheater is positioned immediately prior to the final panel section.

4. A chemical recovery unit including an upright furnace, means for introducing liquor thereinto for burning the burnables and smelting the chemicals therein, means for removing smelted chemicals from the lower region thereof, said unit including means for generating superheated steam of at least about 900° F. including a plurality of vertically extending superheater panels disposed in spaced relation across the width of the upper portion of the furnace with the panels being oriented from the front to the back of the furnace, each panel being comprised of a plurality of sections that are interconnected for serial steam flow, an inlet header with which the tubes of one of said sections is connected and an outlet header with which the tubes of the final section are connected with the steam issuing from the final section into said outlet header being at said desired final temperature, each of said sections being comprised of a number of parallel side-by-side tubes extending up and down the length of the panel a number of times, the tubes being sinuously bent and internested and the initial run of at least one of the tubes of the final section being bent at the lower end thereof to extend across and beneath the lower end of this final section adjacent the lower regions of the tubes of the final panel section and thereby forming the lower edge of this final section, whereby the molten chemical which runs down this final panel section drips from this tube portion forming the lower edge thereof.

5. A chemical recovery unit including an upright furnace, means for introducing liquor into said furnace for burning the burnables and smelting the chemicals therein, means for removing smelted chemical from the lower region of the furnace, said unit including means for superheating steam and including a plurality of superheater panels disposed in spaced relation across the upper portion of the furnace and extending downwardly thereinto and downwardly along which flows molten chemical, with these panels including the finishing stage of the superheater wherein the steam is heated to its final desired high temperature, each of said panels being comprised of numerous vertically extending coplanar bare tube runs, extending generally throughout the height of the panel and serially interconnected at their upper and lower ends by return bends with the steam egressing from the final run being at a final desired high temperature, a laterally disposed tubular extension interconnecting a pair of said runs which are located in the panel remote from said final run, said extension being disposed in the plane of the panel adjacent and beneath at least the return bend connected with the lower end of the final run, whereby the molten chemical which runs down the panel drips from this laterally disposed tubular extension which forms the lower end of this portion of the panel.

6. In a chemical recovery unit the combination of an upright furnace into the lower region of which liquor is introduced and burned and which has a laterally directed combustion gas outlet at its upper region, superheater means extending down into the upper region of the furnace and comprised of tubular panels with the panels being vertically disposed and placed in parallel spaced relation across the upper furnace region and extending out from the wall having the combustion gas outlet with at least a portion of each panel being disposed so that the lower end thereof is initially contacted by combustion gases rising up through the furnace, each panel being comprised of numerous coplanar vertically extending tube runs interconnected at their upper and lower ends by return bends to form a series flow circuit, the final tube run of the panel being in said panel portion which is initially contacted at its lower end by combustion gases passing upwardly through the furnace, a laterally disposed tubular extension interconnecting a pair of said runs located in the panel remote from said final run, said extension being disposed in the plane of the panel and adjacent to and beneath a number of said return bends including the return bend connected with the lower end of the final run, whereby the molten chemical which runs down the panel drips from the laterally disposed tubular extension which forms the lower end of this portion of the panel.

References Cited in the file of this patent

UNITED STATES PATENTS

| | | |
|---|---|---|
| 2,063,441 | Kerr | Dec. 8, 1936 |
| 2,308,762 | Krug | Jan. 19, 1943 |
| 2,893,829 | Hutton | July 7, 1959 |

FOREIGN PATENTS

| | | |
|---|---|---|
| 727,708 | Great Britain | Apr. 6, 1955 |
| 780,646 | Great Britain | Aug. 7, 1957 |